US008775500B2

(12) United States Patent
Watanabe (10) Patent No.: US 8,775,500 B2
(45) Date of Patent: Jul. 8, 2014

(54) DISTRIBUTED COMPUTING SYSTEM HAVING LEADER SIGNALED AGENTS TO EXECUTE TASK AFTER DATA ACQUISITION COMPLETION

(75) Inventor: Noritaka Watanabe, Tokyo (JP)

(73) Assignee: Tritech Inc., Tokyo (JP)

( * ) Notice: Subject to any disclaimer, the term of this patent is extended or adjusted under 35 U.S.C. 154(b) by 94 days.

(21) Appl. No.: 13/560,630

(22) Filed: Jul. 27, 2012

(65) Prior Publication Data

US 2012/0317223 A1 Dec. 13, 2012

Related U.S. Application Data

(63) Continuation of application No. PCT/JP2011/051562, filed on Jan. 27, 2011.

(30) Foreign Application Priority Data

Feb. 4, 2010 (JP) .................................. 2010-023612

(51) Int. Cl.
*G06F 15/16* (2006.01)
*H04L 29/08* (2006.01)
*H04L 12/26* (2006.01)

(52) U.S. Cl.
CPC .... *H04L 29/08189* (2013.01); *H04L 29/08171* (2013.01); *H04L 29/08153* (2013.01); *H04L 29/08144* (2013.01); *H04L 43/08* (2013.01)
USPC ............................ 709/202; 709/201; 709/224

(58) Field of Classification Search
CPC ................... H04L 29/08189; H04L 29/08171; H04L 29/08153; H04L 29/08144; H04L 43/08
USPC .......... 709/201, 202, 217, 218, 219, 237, 242, 709/206, 226, 224; 714/4, 11; 707/822
See application file for complete search history.

(56) References Cited

U.S. PATENT DOCUMENTS 7,774,469 B2 * 8/2010 Massa et al. ................... 709/226
8,346,824 B1 * 1/2013 Lyle et al. ..................... 707/822
(Continued)

FOREIGN PATENT DOCUMENTS

JP A-2005-502957 1/2005
JP A-2005-196763 7/2005
(Continued)

OTHER PUBLICATIONS

Apr. 19, 2011 International Search Report issued in International Patent Application No. PCT/JP2011/051562.
Apr. 6, 2011 Written Opinion of the International Searching Authority issued in International Patent Application No. PCT/JP2011/051562 (with partial translation).

*Primary Examiner* — Le H Luu
(74) *Attorney, Agent, or Firm* — Oliff PLC (57) ABSTRACT

In a distributed computing system pertaining to the present invention, servers 2a to 2c constituting a cell achieve consensus using Paxos and execute a task using predetermined data in accordance with an instruction from a client 3. The server 2a, which acts as a leader, transmits a data acquisition promotion signal to the servers 2b and 2c, which act as agents. When the servers 2b and 2c do not store the data therein, they acquire the data and then transmit a data acquisition completion signal to the server 2a. After the server 2a acquires the data, when it receives the data acquisition completion signal from at least half of the servers constituting the cell, it transmits an execution signal for instructing execution of the task to the servers 2b and 2c. The servers 2b and 2c execute the task using the data.

9 Claims, 5 Drawing Sheets

(56) References Cited

U.S. PATENT DOCUMENTS

| | | |
|---|---|---|
| 2005/0283644 A1* | 12/2005 | Lorch et al. ............... 714/4 |
| 2005/0283659 A1* | 12/2005 | Lamport et al. ............ 714/11 |
| 2006/0136781 A1 | 6/2006 | Lamport |
| 2007/0124342 A1 | 5/2007 | Yamamoto et al. |
| 2008/0071853 A1* | 3/2008 | Mosier et al. .............. 709/201 |
| 2009/0150566 A1* | 6/2009 | Malkhi et al. .............. 709/242 |
| 2010/0017495 A1* | 1/2010 | Lamport .................... 709/206 |

FOREIGN PATENT DOCUMENTS

| | | |
|---|---|---|
| JP | A-2006-004433 | 1/2006 |
| JP | A-2006-155614 | 6/2006 |
| WO | WO 2007/063944 A1 | 6/2007 |

* cited by examiner

DISTRIBUTED COMPUTING SYSTEM HAVING LEADER SIGNALED AGENTS TO EXECUTE TASK AFTER DATA ACQUISITION COMPLETION

CROSS REFERENCE TO RELATED APPLICATION

This is a Continuation of International Application No. PCT/JP2011/051562 filed Jan. 27, 2011, which claims the benefit of Japanese Application No. 2010-023612 filed Feb. 4, 2010. The disclosure of the prior applications are hereby incorporated by reference herein in their entirety.

TECHNICAL FIELD

The present invention relates to distributed computing technology whereby a plurality of computing devices constituting a cell achieve consensus using Paxos with a part of the computing devices acting as a leader and the others acting as agents, and execute a task using predetermined data in accordance with an instruction from a client.

BACKGROUND ART

In recent years, attention has been drawn to distributed computing aimed at efficient use of resources and the like. Such distributed computing is called cloud and offers various types of services according to such models as Software as a Service (SaaS), Platform as a Service (PaaS), and Infrastructure as a Service (IaaS). In distributed computing, a plurality of computing devices constituting a cell execute a task instructed by a client in coordination with one another, and therefore consensus may be achieved among the computing devices. One example of algorithms for achieving consensus in this manner is Paxos described in, for instance, PLT 1 through PLT 3.

Paxos is a consensus algorithm according to which each of computing devices constituting a cell acts as a leader or an agent. Paxos works such that, before the distributed computing system executes a predetermined function, the leader checks whether or not computing devices constituting a quorum (majority) agree on the function; if consensus is achieved to that effect, the execution is started. Use of such an algorithm allows easily synchronizing the computing devices, thus achieving high availability.

CITATION LIST

Patent Literature

[PLT1] JP 2005-196763A
[PLT2] JP 2006-4433A
[PLT3] JP 2006-155614A

SUMMARY OF THE INVENTION

Technical Problem

Incidentally, in the case where a task instructed by a client needs to be executed using predetermined data provided by the client and the like, using Paxos as a consensus algorithm could end up with the situation in which, after the computing devices commenced execution of the task by way of achievement of consensus, some of the computing devices cannot acquire the predetermined data because of communication failures or other reasons. Under such a circumstance, a sequence of processes leading thereto (from a process in which the leader issues an inquiry to the agents about proposals relating to the latest votes through a process in which an instruction for execution is issued by way of achievement of consensus) goes to waste, and moreover, the system may have to be aborted. This triggers the problem of stalled distributed processing.

The present invention has been made in view of the above issues, and aims to provide a distributed computing system, a distributed computing method, and a program for distributed computing that can, when executing a task that requires use of predetermined data with Paxos, suppress a delay in distributed processing caused by the failure of computing devices to acquire the data.

Solution to Problem

To achieve the above aim, the present invention has the following characteristics.

The invention of Claim 1 is a distributed computing system in which a plurality of computing devices constituting a cell achieve consensus using Paxos with a part of the plurality of computing devices acting as a leader and the remaining computing devices acting as agents, and execute a task using predetermined data in accordance with an instruction from a client. In this system: the leader transmits, to the agents, a data acquisition promotion signal for urging the agents to acquire the data; an agent that has received the data acquisition promotion signal and that does not store the data therein acquires the data and then transmits a data acquisition completion signal to the leader; after the leader has acquired the data, when the leader receives the data acquisition completion signal from at least half of the computing devices constituting the cell, the leader transmits an execution signal for instructing execution of the task to the agents; and upon receiving the execution signal, the agents execute the task using the data.

The invention of Claim 2 is a distributed computing system in which a plurality of computing devices constituting a cell achieve consensus using Paxos with a part of the plurality of computing devices acting as a leader and the remaining computing devices acting as agents, and execute a task using predetermined data in accordance with an instruction from a client. In this system: the leader transmits, to the agents, a data storage confirmation signal for inquiring about whether or not the data is stored in the agents; among the agents that have received the data storage confirmation signal, one or more specific agents that store the data therein transmit, to the leader, a data storage signal for notifying that the one or more specific agents store the data therein; upon receiving the data storage signal, the leader transmits, to the one or more specific agents that have transmitted the data storage signal, a proxy signal for instructing the one or more specific agents to transmit a data acquisition promotion signal for urging other agents to acquire the data in place of the leader; upon receiving the proxy signal, the one or more specific agents transmit the data acquisition promotion signal to other agents; an agent that has received the data acquisition promotion signal and that does not store the data therein acquires the data and then transmits a data acquisition completion signal to the leader; when the leader receives the data acquisition completion signal from at least half of the computing devices constituting the cell, the leader transmits an execution signal for instructing execution of the task to the agents; and upon receiving the execution signal, the agents execute the task using the data.

The invention of Claim 3 is a distributed computing system in which a plurality of computing devices constituting a cell achieve consensus using Paxos with a part of the plurality of computing devices acting as a leader and the remaining computing devices acting as agents, and execute a task using predetermined data in accordance with an instruction from a client. In this system: the leader transmits, to the agents, a data storage confirmation signal for inquiring about whether or not the data is stored in the agents; among the agents that have received the data storage confirmation signal, one or more specific agents that store the data therein transmit, to the leader, a data storage signal for notifying that the one or more specific agents store the data therein; upon receiving the data storage signal, the leader transmits, to agents other than the one or more specific agents that have transmitted the data storage signal, a data acquisition promotion signal for urging the other agents to acquire the data from the one or more specific agents; an agent that has received the data acquisition promotion signal and that does not store the data therein acquires the data and then transmits a data acquisition completion signal to the leader; when the leader receives the data acquisition completion signal from at least half of the computing devices constituting the cell, the leader transmits an execution signal for instructing execution of the task to the agents; and upon receiving the execution signal, the agents execute the task using the data.

The invention of Claim 4 is a distributed computing method whereby a plurality of computing devices constituting a cell achieve consensus using Paxos with a part of the plurality of computing devices acting as a leader and the remaining computing devices acting as agents, and execute a task using predetermined data in accordance with an instruction from a client. This distributed computing method includes: a step in which the leader transmits, to the agents, a data acquisition promotion signal for urging the agents to acquire the data; a step in which an agent that has received the data acquisition promotion signal and that does not store the data therein acquires the data and then transmits a data acquisition completion signal to the leader; a step in which, after the leader has acquired the data, when the leader receives the data acquisition completion signal from at least half of the computing devices constituting the cell, the leader transmits an execution signal for instructing execution of the task to the agents; and a step in which the agents execute the task using the data upon receiving the execution signal.

The invention of Claim 5 is a distributed computing method whereby a plurality of computing devices constituting a cell achieve consensus using Paxos with a part of the plurality of computing devices acting as a leader and the remaining computing devices acting as agents, and execute a task using predetermined data in accordance with an instruction from a client. This distributed computing method includes: a step in which the leader transmits, to the agents, a data storage confirmation signal for inquiring about whether or not the data is stored in the agents; a step in which, among the agents that have received the data storage confirmation signal, one or more specific agents that store the data therein transmit, to the leader, a data storage signal for notifying that the one or more specific agents store the data therein; a step in which, upon receiving the data storage signal, the leader transmits, to the one or more specific agents that have transmitted the data storage signal, a proxy signal for instructing the one or more specific agents to transmit a data acquisition promotion signal for urging other agents to acquire the data in place of the leader; a step in which, upon receiving the proxy signal, the one or more specific agents transmit the data acquisition promotion signal to other agents; a step in which an agent that has received the data acquisition promotion signal and that does not store the data therein acquires the data and then transmits a data acquisition completion signal to the leader; a step in which, when the leader receives the data acquisition completion signal from at least half of the computing devices constituting the cell, the leader transmits an execution signal for instructing execution of the task to the agents; and a step in which the agents execute the task using the data upon receiving the execution signal.

The invention of Claim 6 is a distributed computing method whereby a plurality of computing devices constituting a cell achieve consensus using Paxos with a part of the plurality of computing devices acting as a leader and the remaining computing devices acting as agents, and execute a task using predetermined data in accordance with an instruction from a client. This distributed computing method includes: a step in which the leader transmits, to the agents, a data storage confirmation signal for inquiring about whether or not the data is stored in the agents; a step in which, among the agents that have received the data storage confirmation signal, one or more specific agents that store the data therein transmit, to the leader, a data storage signal for notifying that the one or more specific agents store the data therein; a step in which, upon receiving the data storage signal, the leader transmits, to agents other than the one or more specific agents that have transmitted the data storage signal, a data acquisition promotion signal for urging the other agents to acquire the data from the one or more specific agents; a step in which an agent that has received the data acquisition promotion signal and that does not store the data therein acquires the data and then transmits a data acquisition completion signal to the leader; a step in which, when the leader receives the data acquisition completion signal from at least half of the computing devices constituting the cell, the leader transmits an execution signal for instructing execution of the task to the agents; and a step in which the agents execute the task using the data upon receiving the execution signal.

The invention of Claim 7 is a program for distributed computing that causes a plurality of computing devices constituting a cell to function to achieve consensus using Paxos with a part of the plurality of computing devices acting as a leader and the remaining computing devices acting as agents, and to execute a task using predetermined data in accordance with an instruction from a client. This program for distributed computing includes: a step of causing the leader to transmit, to the agents, a data acquisition promotion signal for urging the agents to acquire the data; a step of causing an agent that has received the data acquisition promotion signal and that does not store the data therein to acquire the data and then transmit a data acquisition completion signal to the leader; a step of causing the leader to, when receiving the data acquisition completion signal from at least half of the computing devices constituting the cell after acquiring the data, transmit an execution signal for instructing execution of the task to the agents; and a step of causing the agents to execute the task using the data upon receiving the execution signal.

The invention of Claim 8 is a program for distributed computing that causes a plurality of computing devices constituting a cell to function to achieve consensus using Paxos with a part of the plurality of computing devices acting as a leader and the remaining computing devices acting as agents, and to execute a task using predetermined data in accordance with an instruction from a client. This program for distributed computing includes: a step of causing the leader to transmit, to the agents, a data storage confirmation signal for inquiring about whether or not the data is stored in the agents; a step of causing one or more specific agents that are included among the agents having received the data storage confirmation signal and that store the data therein to transmit, to the leader, a data storage signal for notifying that the one or more specific agents store the data therein; a step of causing the leader to, upon receiving the data storage signal, transmit a proxy signal to the one or more specific agents that have transmitted the data storage signal, the proxy signal instructing the one or more specific agents to transmit a data acquisition promotion signal for urging other agents to acquire the data in place of the leader; a step of causing the one or more specific agents to, upon receiving the proxy signal, transmit the data acquisition promotion signal to other agents; a step of causing an agent that has received the data acquisition promotion signal and that does not store the data therein to acquire the data and then transmit a data acquisition completion signal to the leader; a step of causing the leader to, when receiving the data acquisition completion signal from at least half of the computing devices constituting the cell, transmit an execution signal for instructing execution of the task to the agents; and a step of causing the agents to execute the task using the data upon receiving the execution signal.

The invention of Claim 9 is a program for distributed computing that causes a plurality of computing devices constituting a cell to function to achieve consensus using Paxos with a part of the plurality of computing devices acting as a leader and the remaining computing devices acting as agents, and to execute a task using predetermined data in accordance with an instruction from a client. This program for distributed computing includes: a step of causing the leader to transmit, to the agents, a data storage confirmation signal for inquiring about whether or not the data is stored in the agents; a step of causing one or more specific agents that are included among the agents having received the data storage confirmation signal and that store the data therein to transmit, to the leader, a data storage signal for notifying that the one or more specific agents store the data therein; a step of causing the leader to, upon receiving the data storage signal, transmit a data acquisition promotion signal to agents other than the one or more specific agents that have transmitted the data storage signal, the data acquisition promotion signal urging the other agents to acquire the data from the one or more specific agents; a step of causing an agent that has received the data acquisition promotion signal and that does not store the data therein to acquire the data and then transmit a data acquisition completion signal to the leader; a step of causing the leader to, when receiving the data acquisition completion signal from at least half of the computing devices constituting the cell, transmit an execution signal for instructing execution of the task to the agents; and a step of causing the agents to execute the task using the data upon receiving the execution signal.

According to the invention of Claims 1, 4 and 7, before the leader instructs execution of the task, the leader transmits the data acquisition promotion signal to urge the agents to acquire the data. Therefore, the agents can use the data that has already been acquired and stored therein when executing the task. This can prevent the situation in which the distributed processing is stalled because the agents have not acquired the data by the time of execution of the task.

According to the invention of Claims 2, 5 and 8, before the leader instructs execution of the task, the leader transmits the proxy signal to urge other agents to acquire the data via one or more specific agents that store the data therein. Therefore, the agents can use the data that has already been acquired and stored therein when executing the task. This can prevent a delay in the distributed processing caused by the failure of the computing devices to acquire the data, as with the invention of Claims 1, 4 and 7.

According to the invention of Claims 3, 6 and 9, before the leader instructs execution of the task, the leader transmits the data acquisition promotion signal to urge other agents to acquire the data from one or more specific agents that store the data therein. Therefore, the agents can use the data that has already been acquired and stored therein when executing the task. This can suppress a delay in the distributed processing caused by the failure of the computing devices to acquire the data, as with the invention of Claims 1, 2, 4, 5, 7 and 8.

Advantageous Effects of Invention

The present invention has the effect of, when executing a task that requires use of predetermined data with Paxos, suppressing a delay in distributed processing caused by the failure of computing devices to acquire the data.

DESCRIPTION OF EMBODIMENTS

A description is now given of an embodiment of the present invention with reference to the drawings.

[Distributed Computing System]

Figure 1:
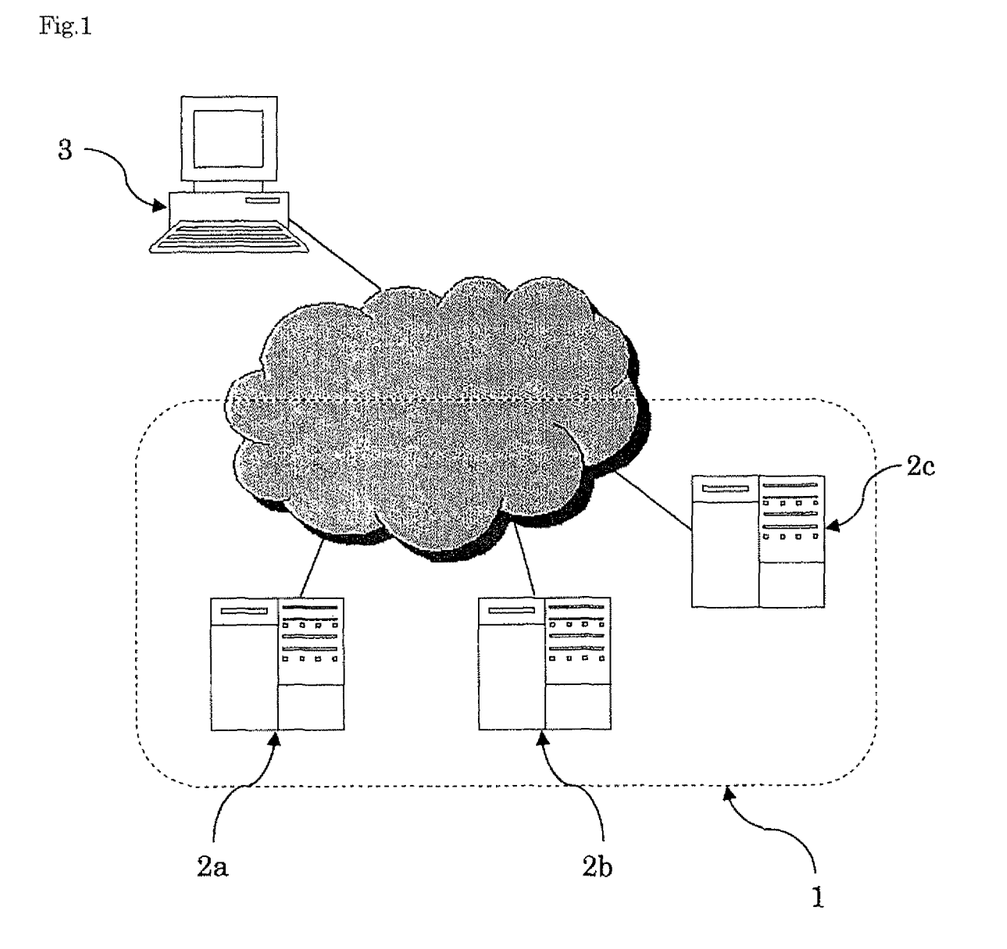
FIG. 1 illustrates a distributed computing system pertaining to an embodiment of the invention.

FIG. 1 illustrates a distributed computing system pertaining to the present embodiment. This distributed computing system includes a cell 1 that is constituted by a plurality of computing devices (hereinafter, "devices"). Although three servers 2a, 2b and 2c are exemplarily presented as devices in the present embodiment, the types and the number of devices are not limited in this way.

Figure 2:
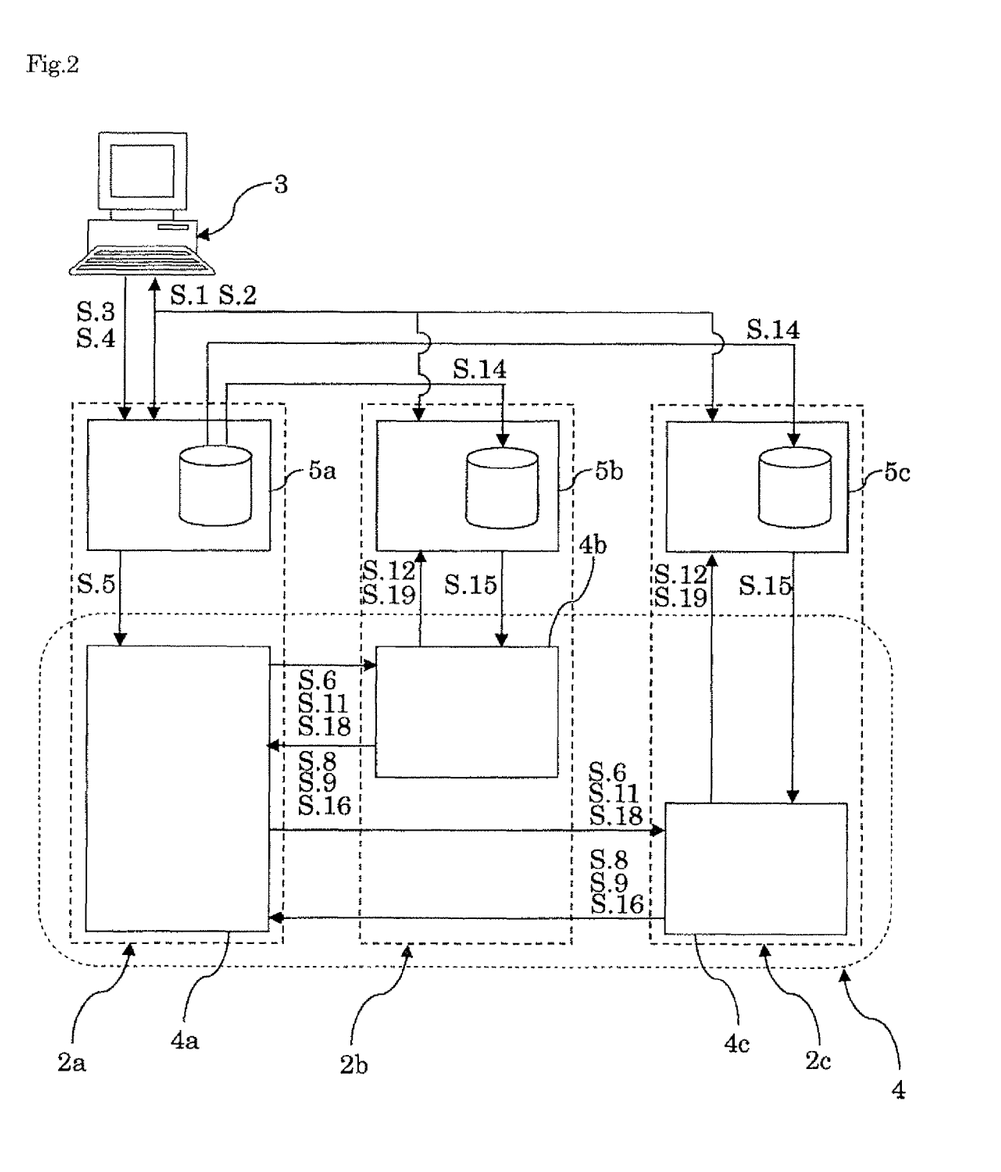
FIG. 2 illustrates exchange of signals and data in the distributed computing system illustrated in FIG. 1.

The servers 2a, 2b and 2c are connected to and can communicate with one another. The servers 2a, 2b and 2c are also connected to a client 3 that knows IP addresses of the servers 2a, 2b and 2c via the Internet, and upon receiving an instruction from the client 3, execute a task such as calculation processing (hereinafter, "the present task") using predetermined data in coordination with one another. An application program for the present task, as well as a program for distributed computing that executes distributed processing of the present task, are installed on all the servers 2a, 2b and 2c. The servers 2a, 2b and 2c are general-purpose computers. However, for the sake of convenience, processor capabilities and storage capabilities of CPUs and storage devices in the servers 2a, 2b and 2c may be divided as consensus achievement units 4a, 4b and 4c and execution units 5a, 5b and 5c, as shown in FIG. 2.

The consensus achievement units 4a, 4b and 4c constitute a Paxos device 4 for achieving consensus in the cell 1 using Paxos. The consensus achievement units in the Paxos device 4 pass metadata to one another by value in accordance with the aforementioned program for distributed computing using a predetermined in-band communication method, such as the User Datagram Protocol (UDP).

The execution units 5a, 5b and 5c execute the present task in accordance with the aforementioned application program.

The execution units 5a, 5b and 5c can exchange mass data between themselves and with the client 3 using an out-of-band data transfer method, such as the File Transfer Protocol (FTP) and the Remote Direct Memory Access (RDMA).

[Distributed Computing Method]

Figure 3:
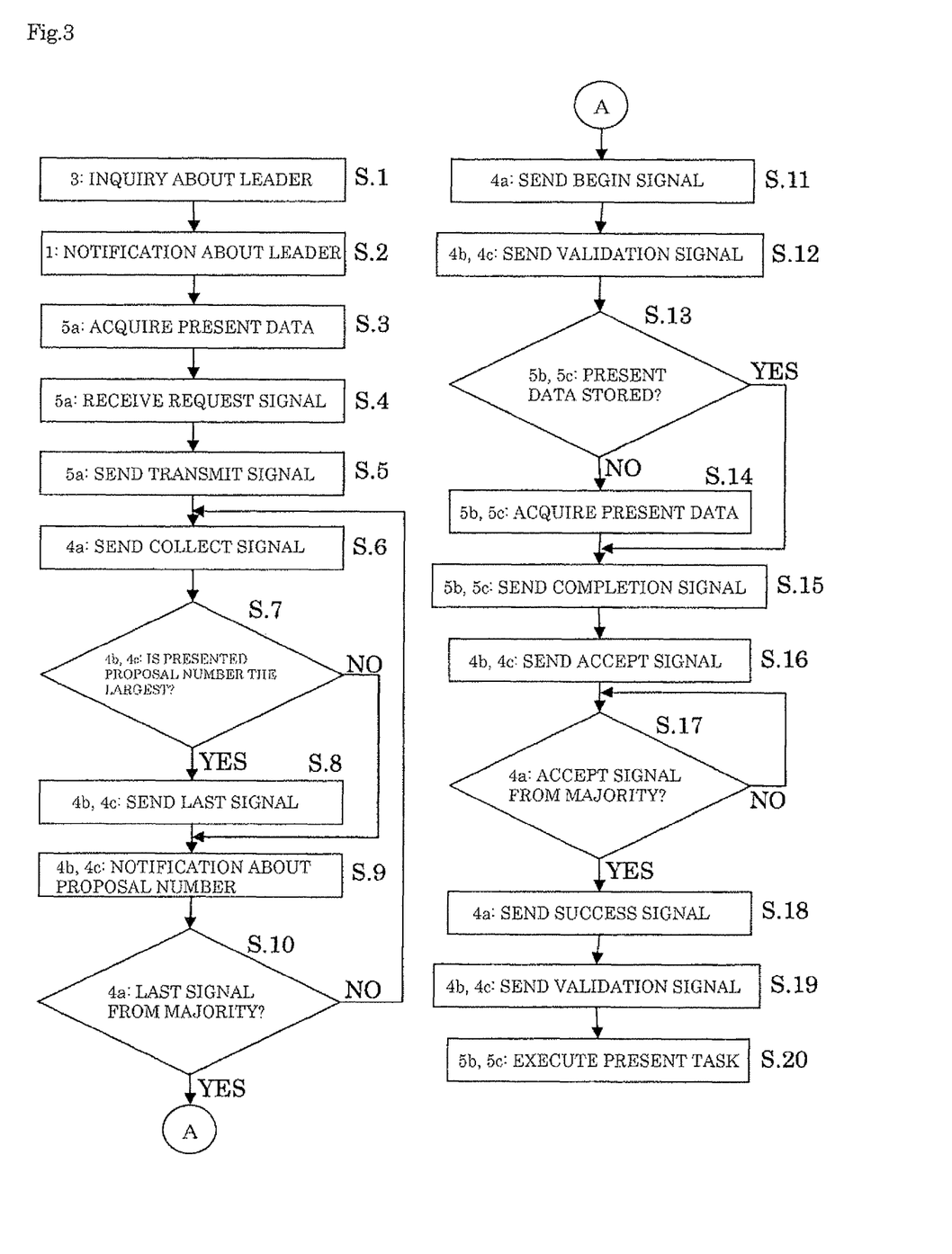
FIG. 3 is a flowchart showing a distributed computing method of the distributed computing system illustrated in FIG. 1.

As shown in FIG. 3, when executing the present task, the client 3 issues an inquiry to the cell 1 about which one of the servers is the leader (step 1, which is indicated as "S. 1" in the figures; hereinafter, the same rule applies). As the client 3 knows IP addresses of the servers 2a, 2b and 2c, it can learn which one of the servers 2a, 2b and 2c is the leader from one of the servers 2a, 2b and 2c (step 2). When none of the servers 2a, 2b and 2c holds information about the leader because, for example, the leader has not been selected yet, the servers 2a, 2b and 2c may select the leader from among themselves upon receiving the inquiry from the client 3. The leader may be selected using any method. The frequency of switching between leaders can be reduced, for example, by selecting the most senior server that was activated earliest as the leader. In the present embodiment, only one server can act as the leader, and therefore multiple leaders are not selected (note, however, that there may be cases where multiple leaders coexist temporarily in the course of switching between leaders).

It is assumed here that the server 2a is the leader. When the client 3 learns which server is the leader through the inquiry in step 1, it transmits mass data (hereinafter, "present data"), which serves as predetermined data used for the present task, to the execution unit 5a using the out-of-band data transfer method, and the transmitted mass data is stored in the execution unit 5a (step 3). When this data transmission is completed, the client 3 transmits a request signal for requesting the present task to the execution unit 5a (step 4).

Upon receiving the request signal, the execution unit 5a notifies the consensus achievement unit 4a of the request for the present task via a transmit signal (step 5). Upon receiving the transmit signal, the consensus achievement unit 4a transmits a collect signal to the consensus achievement units 4b and 4c to achieve consensus on execution of the present task in the Paxos device 4 (step 8). The collect signal presents a proposal number for the present task and requests the consensus achievement units 4b and 4c for notification about the proposal number for which the consensus achievement units 4b and 4c voted most recently.

When the proposal number for which the consensus achievement units 4b and 4c voted most recently is smaller than the presented proposal number, or when the consensus achievement units 4b and 4c have not voted yet, the consensus achievement units 4b and 4c return a last signal for supporting the retainment of the presented proposal number to the consensus achievement unit 4a (steps 7 and 8), and notify the consensus achievement unit 4a of the proposal number for which they voted most recently (0 when they have not voted yet) (step 9). When the proposal number for which the consensus achievement units 4b and 4c voted most recently is greater than or equal to the presented proposal number, they do not transmit the last signal but transmit the proposal number for which they voted most recently.

When receiving the last signal from a majority of servers, the consensus achievement unit 4a transmits, to the consensus achievement units 4b and 4c, a begin signal as a data acquisition promotion signal for urging the servers 2b and 2c to acquire the data (steps 10 and 11). The begin signal includes information of a location of the present data. As the server 2a has already acquired the present data, the servers 2b and 2c learn from the begin signal that the present data is in the server 2a.

It is considered that transmission/reception of the last signal has been performed within the consensus achievement unit of the leader. Therefore, the condition "receiving the last signal from a majority of servers" in step 10 is satisfied practically when the last signal has been acquired from at least half of agents, namely, from one of the servers 2b and 2c. When the last signal has not been acquired from the majority of servers, the server 2a may, for example, increase the proposal number and retransmit a collect signal presenting the increased proposal number.

Upon receiving the begin signal, the consensus achievement units 4b and 4c transmit, to the execution units 5b and 5c, a validation signal that includes information of the location of the present data and requests acquisition of the present data (step 12). The execution units 5b and 5c check whether or not the present data is stored in their storage devices (step 13), and when the present data is not stored therein, acquire the present data from the execution unit 5a using the out-of-band data transfer method (step 14). When the present data was already stored at the time of reception of the validation signal, or once the present data has been stored after completing the acquisition of the present data, the execution units 5b and 5c transmit a completion signal to the consensus achievement units 4b and 4c (step 15).

Upon receiving the completion signal, the consensus achievement units 4b and 4c transmit an accept signal as a data acquisition completion signal to the consensus achievement unit 4a (step 1.6). When the accept signal has been acquired from a majority of servers (the meaning thereof is similar to that for the case of the aforementioned last signal), the consensus achievement unit 4a transmits, to the consensus achievement units 4b and 4c, a success signal as an execution signal for instructing the servers 2b and 2c to execute the present task (steps 17 and 18).

Upon receiving the success signal, the consensus achievement units 4b and 4c transmit a validation signal for requesting execution of the present task to the execution units 5b and 5c (step 19). The execution units 5b and 5c accordingly start distributed processing of the present task using the present data stored in their storage devices (step 20).

According to the distributed computing system pertaining to the present embodiment, before the server 2a instructs execution of the present task, the server 2a transmits a begin signal to urge the servers 2b and 2c to acquire the present data. Therefore, the servers 2b and 2c can use the present data that has already been acquired and stored therein when executing the present task. This can prevent the situation in which the distributed processing is stalled because the agents have not acquired the data by the time of execution of the present task.

[Distributed Computing Method for the Case where the Leader Changed]

Figure 4:
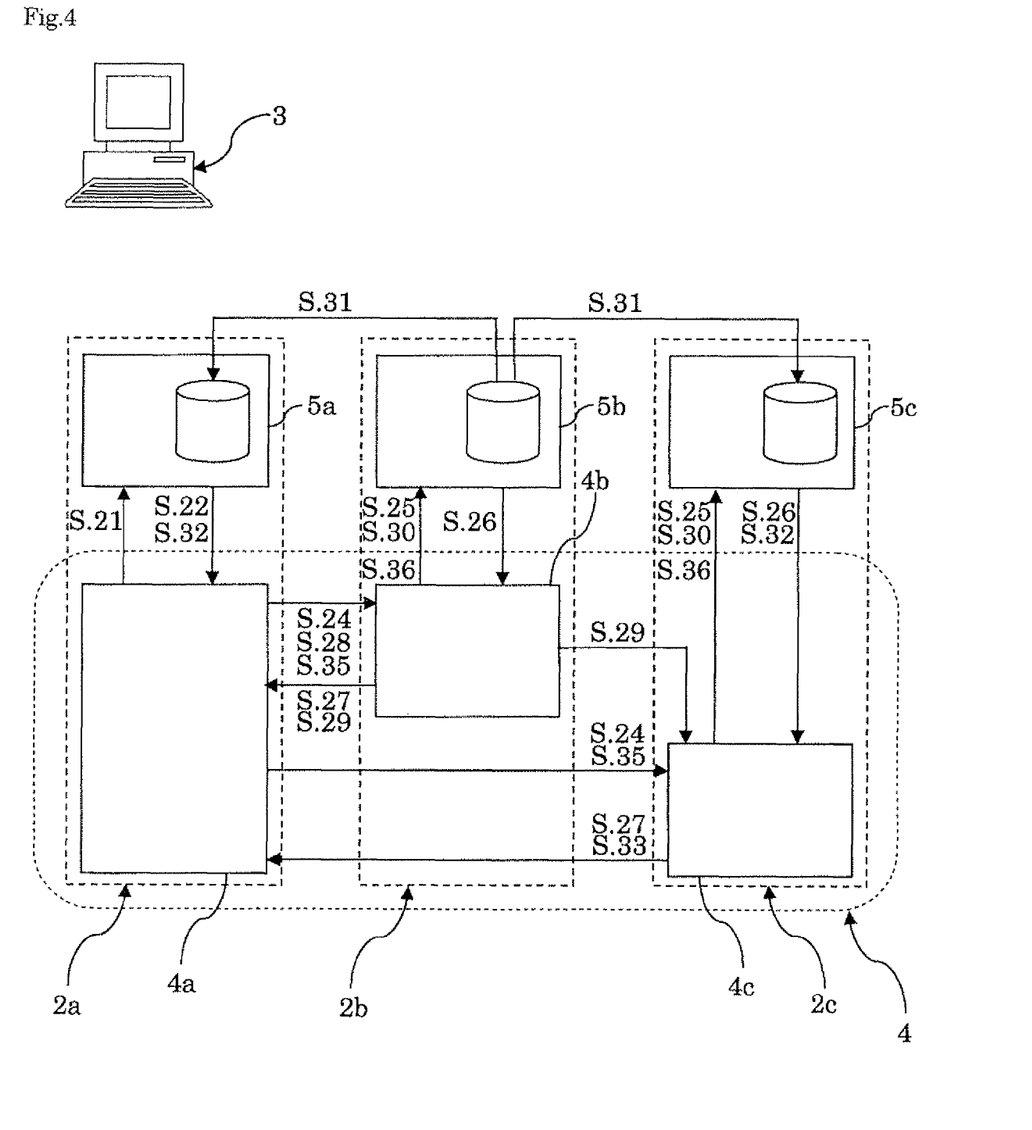
FIG. 4 illustrates exchange of signals and data for the case where the leader has changed in the distributed computing system illustrated in FIG. 1.
Figure 5:
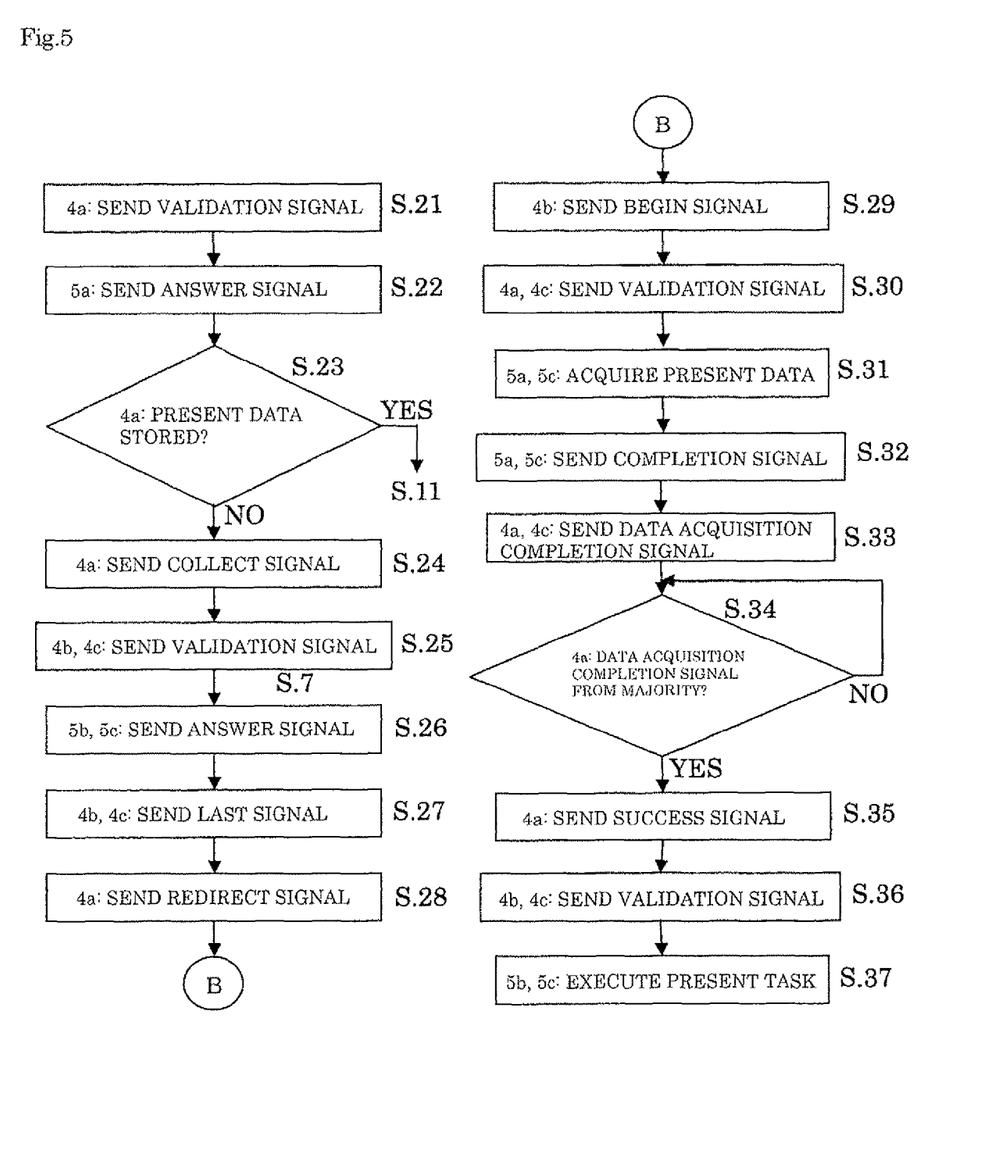
FIG. 5 is a flowchart showing a distributed computing method for the case where the leader has changed in the distributed computing system illustrated in FIG. 1.

As has been described above, in the cell 1, the leader normally transmits the begin signal to the other agents. However, when the leader is replaced due to the occurrence of trouble and the like to the leader, processing shown in FIGS. 4 and 5 is executed.

More specifically, provided that a server acting as a new leader is given the reference sign 2a, its consensus achievement unit 4a transmits a validation signal to the execution unit 5a to check whether or not the present data is stored in the server 2a (step 21). In response, the execution unit 5a notifies the consensus achievement unit 4a of whether or not the present data is stored via an answer signal (step 22). When the present data is stored in the execution unit 5a, processes of step 11 onward in FIG. 3 are executed. When the present data is not stored in the execution unit 5a, the consensus achievement unit 4a transmits, to the consensus achievement units 4b and 4c, a collect signal as a data storage confirmation signal for inquiring about whether or not the present data is stored in the servers 2b and 2c (steps 23 and 24).

Upon receiving the collect signal, the consensus achievement units 4b and 4c transmit a validation signal to the execution units 5b and 5c to check whether or not the present data is stored in the servers 2b and 2c (step 25). It is assumed here that the present data is stored in the execution unit 5b but not stored in the execution unit 5c, and that the execution units 5b and 5c have accordingly transmitted the answer signal to the consensus achievement units 4b and 4c, respectively (step 26).

Upon receiving the answer signal, the consensus achievement units 4b and 4c notify the consensus achievement unit 4a of the status of data storage via the last signal (step 27). At this time, as the consensus achievement unit 4b notifies the consensus achievement unit 4a that the present data is stored in the execution unit 5b, it transmits the last signal as a data storage signal.

Upon receiving the last signal, the consensus achievement unit 4a transmits, to the consensus achievement unit 4b of the server 2b in which the present data is stored, a redirect signal as a proxy signal for instructing transmission of a begin signal, which will be described below (step 28).

Upon receiving the redirect signal, the consensus achievement unit 4b transmits the begin signal as a data acquisition promotion signal to the consensus achievement units 4a and 4c so as to urge the servers 2a and 2c to acquire the present data (step 29). The begin signal includes information of a location of the present data. As the present data is already stored in the server 2b, the server 2c learns from the begin signal that the present data is in the server 2b.

Upon receiving the begin signal, the consensus achievement units 4a and 4c transmit, to the execution units 5a and 5c, a validation signal that includes information of the location of the present data and requests acquisition of the present data (step 30). The execution units 5a and 5c acquire the present data from the execution unit 5b using the out-of-band data transfer method (step 31). Once the present data has been stored after completing the acquisition of the present data, the execution units 5a and 5c transmit a completion signal to the consensus achievement units 4a and 4c (step 32).

Upon receiving the completion signal, the consensus achievement unit 4c transmits an accept signal for notifying completion of the acquisition of the present data to the consensus achievement unit 4a (step 33). When this data acquisition completion signal has been acquired from a majority of servers (as it is known that the server 2b has already acquired the data, this condition is satisfied practically when the consensus achievement unit 4a has received the data acquisition completion signal from at least half of the servers constituting the cell 1, namely, the completion signal from within the server 2a or the accept signal from the consensus achievement unit 4c), the consensus achievement unit 4a transmits, to the consensus achievement units 4b and 4c, a success signal as an execution signal for instructing the servers 2b and 2c to execute the present task (steps 34 and 35).

Upon receiving the success signal, the consensus achievement units 4b and 4c transmit a validation signal for requesting execution of the present task to the execution units 5b and 5c (step 36). The execution units 5b and 5c accordingly start distributed processing of the present task using the present data stored in their storage devices (step 37).

According to the distributed computing system pertaining to the present embodiment, when the leader has been replaced by the new leader, namely the server 2a, if the present data is not stored in the server 2a, then the server 2a transmits a proxy signal before instructing execution of the present task so as to urge other servers to acquire the present data via a specific agent (server 2b) that stores the present data therein. In this way, the servers can use the data that has already been acquired and stored therein when executing the present task. This can suppress a delay in distributed processing caused by the failure of the computing devices to acquire the data.

The above has described an exemplary embodiment of the present invention. However, the present invention is by no means limited to the above embodiment, and various changes may be made as appropriate without departing from the meaning of the present invention.

For example, although the server 2a has been described as transmitting the redirect signal so as to cause the server 2b in which the present data is stored to transmit the begin signal as shown in FIGS. 4 and 5, the server 2a itself may transmit the begin signal (the data acquisition promotion signal for urging acquisition of the present data from the server 2b) to the server 2c.

Furthermore, the timing at which the server 2a acquires the present data may not be prior to reception of the request signal in FIG. 3. Moreover, with the use of TCP or the like for communication between servers, transmission/reception of data at the time of achieving consensus, as well as transmission/reception of the present data, may be performed without distinguishing between in-band communication and out-of-band communication.

INDUSTRIAL APPLICABILITY

The present invention is widely applicable to distributed computing that uses Paxos regardless of types of a task.

REFERENCE SIGNS LIST

1 Cell
2a Server (Leader)
2b, 2c Server (Agent)
3 Client

The invention claimed is:

1. A distributed computing system in which a plurality of computing devices constituting a cell achieve consensus using Paxos with a part of the plurality of computing devices acting as a leader and the remaining computing devices acting as agents, and execute a task using predetermined data in accordance with an instruction from a client, wherein
the leader transmits, to the agents, a data acquisition promotion signal for urging the agents to acquire the data,
an agent that has received the data acquisition promotion signal and that does not store the data therein acquires the data and then transmits a data acquisition completion signal to the leader,
after the leader has acquired the data, when the leader receives the data acquisition completion signal from at least half of the computing devices constituting the cell, the leader transmits an execution signal for instructing execution of the task to the agents, and
upon receiving the execution signal, the agents execute the task using the data.

2. A distributed computing system in which a plurality of computing devices constituting a cell achieve consensus using Paxos with a part of the plurality of computing devices acting as a leader and the remaining computing devices acting as agents, and execute a task using predetermined data in accordance with an instruction from a client, wherein the leader transmits, to the agents, a data storage confirmation signal for inquiring about whether or not the data is stored in the agents, among the agents that have received the data storage confirmation signal, one or more specific agents that store the data therein transmit, to the leader, a data storage signal for notifying that the one or more specific agents store the data therein, upon receiving the data storage signal, the leader transmits, to the one or more specific agents that have transmitted the data storage signal, a proxy signal for instructing the one or more specific agents to transmit a data acquisition promotion signal for urging other agents to acquire the data in place of the leader, upon receiving the proxy signal, the one or more specific agents transmit the data acquisition promotion signal to other agents, an agent that has received the data acquisition promotion signal and that does not store the data therein acquires the data and then transmits a data acquisition completion signal to the leader, when the leader receives the data acquisition completion signal from at least half of the computing devices constituting the cell, the leader transmits an execution signal for instructing execution of the task to the agents, and upon receiving the execution signal, the agents execute the task using the data.

3. A distributed computing system in which a plurality of computing devices constituting a cell achieve consensus using Paxos with a part of the plurality of computing devices acting as a leader and the remaining computing devices acting as agents, and execute a task using predetermined data in accordance with an instruction from a client, wherein the leader transmits, to the agents, a data storage confirmation signal for inquiring about whether or not the data is stored in the agents, among the agents that have received the data storage confirmation signal, one or more specific agents that store the data therein transmit, to the leader, a data storage signal for notifying that the one or more specific agents store the data therein, upon receiving the data storage signal, the leader transmits, to agents other than the one or more specific agents that have transmitted the data storage signal, a data acquisition promotion signal for urging the other agents to acquire the data from the one or more specific agents, an agent that has received the data acquisition promotion signal and that does not store the data therein acquires the data and then transmits a data acquisition completion signal to the leader, when the leader receives the data acquisition completion signal from at least half of the computing devices constituting the cell, the leader transmits an execution signal for instructing execution of the task to the agents, and upon receiving the execution signal, the agents execute the task using the data.

4. A distributed computing method whereby a plurality of computing devices constituting a cell achieve consensus using Paxos with a part of the plurality of computing devices acting as a leader and the remaining computing devices acting as agents, and execute a task using predetermined data in accordance with an instruction from a client, the distributed computing method comprising:

a step in which the leader transmits, to the agents, a data acquisition promotion signal for urging the agents to acquire the data;

a step in which an agent that has received the data acquisition promotion signal and that does not store the data therein acquires the data and then transmits a data acquisition completion signal to the leader;

a step in which, after the leader has acquired the data, when the leader receives the data acquisition completion signal from at least half of the computing devices constituting the cell, the leader transmits an execution signal for instructing execution of the task to the agents; and a step in which the agents execute the task using the data upon receiving the execution signal.

5. A distributed computing method whereby a plurality of computing devices constituting a cell achieve consensus using Paxos with a part of the plurality of computing devices acting as a leader and the remaining computing devices acting as agents, and execute a task using predetermined data in accordance with an instruction from a client, the distributed computing method comprising:

a step in which the leader transmits, to the agents, a data storage confirmation signal for inquiring about whether or not the data is stored in the agents;

a step in which, among the agents that have received the data storage confirmation signal, one or more specific agents that store the data therein transmit, to the leader, a data storage signal for notifying that the one or more specific agents store the data therein;

a step in which, upon receiving the data storage signal, the leader transmits, to the one or more specific agents that have transmitted the data storage signal, a proxy signal for instructing the one or more specific agents to transmit a data acquisition promotion signal for urging other agents to acquire the data in place of the leader;

a step in which, upon receiving the proxy signal, the one or more specific agents transmit the data acquisition promotion signal to other agents;

a step in which an agent that has received the data acquisition promotion signal and that does not store the data therein acquires the data and then transmits a data acquisition completion signal to the leader;

a step in which, when the leader receives the data acquisition completion signal from at least half of the computing devices constituting the cell, the leader transmits an execution signal for instructing execution of the task to the agents; and a step in which the agents execute the task using the data upon receiving the execution signal.

6. A distributed computing method whereby a plurality of computing devices constituting a cell achieve consensus using Paxos with a part of the plurality of computing devices acting as a leader and the remaining computing devices acting as agents, and execute a task using predetermined data in accordance with an instruction from a client, the distributed computing method comprising:

a step in which the leader transmits, to the agents, a data storage confirmation signal for inquiring about whether or not the data is stored in the agents;

a step in which, among the agents that have received the data storage confirmation signal, one or more specific agents that store the data therein transmit, to the leader, a data storage signal for notifying that the one or more specific agents store the data therein;

a step in which, upon receiving the data storage signal, the leader transmits, to agents other than the one or more specific agents that have transmitted the data storage signal, a data acquisition promotion signal for urging the other agents to acquire the data from the one or more specific agents;

a step in which an agent that has received the data acquisition promotion signal and that does not store the data therein acquires the data and then transmits a data acquisition completion signal to the leader;

a step in which, when the leader receives the data acquisition completion signal from at least half of the computing devices constituting the cell, the leader transmits an execution signal for instructing execution of the task to the agents; and a step in which the agents execute the task using the data upon receiving the execution signal.

7. A program, stored on a storage device, for distributed computing that causes a plurality of computing devices constituting a cell to function to achieve consensus using Paxos with a part of the plurality of computing devices acting as a leader and the remaining computing devices acting as agents, and to execute a task using predetermined data in accordance with an instruction from a client, the program for distributed computing comprising:

a step of causing the leader to transmit, to the agents, a data acquisition promotion signal for urging the agents to acquire the data;

a step of causing an agent that has received the data acquisition promotion signal and that does not store the data therein to acquire the data and then transmit a data acquisition completion signal to the leader;

a step of causing the leader to, when receiving the data acquisition completion signal from at least half of the computing devices constituting the cell after acquiring the data, transmit an execution signal for instructing execution of the task to the agents; and a step of causing the agents to execute the task using the data upon receiving the execution signal.

8. A program, stored on a storage device, for distributed computing that causes a plurality of computing devices constituting a cell to function to achieve consensus using Paxos with a part of the plurality of computing devices acting as a leader and the remaining computing devices acting as agents, and to execute a task using predetermined data in accordance with an instruction from a client, the program for distributed computing comprising:

a step of causing the leader to transmit, to the agents, a data storage confirmation signal for inquiring about whether or not the data is stored in the agents;

a step of causing one or more specific agents that are included among the agents having received the data storage confirmation signal and that store the data therein to transmit, to the leader, a data storage signal for notifying that the one or more specific agents store the data therein;

a step of causing the leader to, upon receiving the data storage signal, transmit a proxy signal to the one or more specific agents that have transmitted the data storage signal, the proxy signal instructing the one or more specific agents to transmit a data acquisition promotion signal for urging other agents to acquire the data in place of the leader;

a step of causing the one or more specific agents to, upon receiving the proxy signal, transmit the data acquisition promotion signal to other agents;

a step of causing an agent that has received the data acquisition promotion signal and that does not store the data therein to acquire the data and then transmit a data acquisition completion signal to the leader;

a step of causing the leader to, when receiving the data acquisition completion signal from at least half of the computing devices constituting the cell, transmit an execution signal for instructing execution of the task to the agents; and a step of causing the agents to execute the task using the data upon receiving the execution signal.

9. A program, on a storage device, for distributed computing that causes a plurality of computing devices constituting a cell to function to achieve consensus using Paxos with a part of the plurality of computing devices acting as a leader and the remaining computing devices acting as agents, and to execute a task using predetermined data in accordance with an instruction from a client, the program for distributed computing comprising:

a step of causing the leader to transmit, to the agents, a data storage confirmation signal for inquiring about whether or not the data is stored in the agents;

a step of causing one or more specific agents that are included among the agents having received the data storage confirmation signal and that store the data therein to transmit, to the leader, a data storage signal for notifying that the one or more specific agents store the data therein;

a step of causing the leader to, upon receiving the data storage signal, transmit a data acquisition promotion signal to agents other than the one or more specific agents that have transmitted the data storage signal, the data acquisition promotion signal urging the other agents to acquire the data from the one or more specific agents;

a step of causing an agent that has received the data acquisition promotion signal and that does not store the data therein to acquire the data and then transmit a data acquisition completion signal to the leader;

a step of causing the leader to, when receiving the data acquisition completion signal from at least half of the computing devices constituting the cell, transmit an execution signal for instructing execution of the task to the agents; and a step of causing the agents to execute the task using the data upon receiving the execution signal.

* * * * *